United States Patent [19]

Satoh et al.

[11] Patent Number: 5,112,502
[45] Date of Patent: May 12, 1992

[54] HOMOGENEOUS SUBSTITUTION METHOD AND APPARATUS FOR CAKE USING FILTER PRESS

[75] Inventors: Kazuo Satoh; Koichiro Sekine; Kou Kakisada; Minoru Morita, all of Tokyo, Japan

[73] Assignee: Tsukishima Kikai Co., Ltd., Tokyo, Japan

[21] Appl. No.: 732,740

[22] Filed: Jul. 18, 1991

Related U.S. Application Data

[63] Continuation of Ser. No. 500,386, Mar. 27, 1990.

[51] Int. Cl.⁵ .................... B01D 25/164; B01D 25/28
[52] U.S. Cl. ...................................... 210/770; 100/37; 100/113; 100/197; 100/211; 134/17; 210/224; 210/228; 210/231
[58] Field of Search ............... 210/224, 225, 226, 227, 210/228, 229, 230, 231, 770; 100/37, 113, 115, 196, 197, 198, 211, 295; 134/16, 17

[56] References Cited

U.S. PATENT DOCUMENTS

| 4,722,789 | 2/1988 | Kupka ................. | 210/225 |
| 4,855,062 | 8/1989 | Oelbermann ......... | 210/230 |
| 4,931,177 | 6/1990 | Parmentier ........... | 210/231 |

FOREIGN PATENT DOCUMENTS 2541330  5/1984  France .

OTHER PUBLICATIONS

Chemie-Ingenieur-Technik vol. 41, No. 12, 1969, pp. A923, A924: "Ein neues Waschprinzip Fuer Filterpressen".

Aufbereitungs-Technik vol. 5 May 1971, pp. 285-288: E. Borgmann: "Leistungssteigerung und Rationalsierung in der Druckfiltration durch Membranfilterpresse und Pressfilterautomat".

Primary Examiner—W. Gary Jones
Attorney, Agent, or Firm—Spensley, Horn, Jubas & Lubitz

[57] ABSTRACT

In homogeneous substitution washing method and apparatus for a cake using a filter press which comprises pairs of opposed squeezed and squeezing filtering plate units, pairs of opposed squeezed and squeezing filtering cloths, each pair of filtering cloths being arranged between the pair of filtering plate units, and diaphragms. Each diaphragm is arranged on one side of one of the pair of filtering plate units. Stock solution is supplied into a space between the pair of filtering cloths, and is pressurized and dehydrated by the diaphragm to form the cake. The cake is processed in washing to obtain a clean raw material. In parallel with the pressurizing and dehydrating step of the stock solution, a washing liquid is poured into a space between the diaphragm and the squeezing filtering cloth abutted against the diaphragm, at a pressure at least a pressurizing and dehydrating pressure applied to the stock solution through the diaphragm, to wash the cake between the pair of filtering cloths.

2 Claims, 2 Drawing Sheets

HOMOGENEOUS SUBSTITUTION METHOD AND APPARATUS FOR CAKE USING FILTER PRESS

This a continuation of copending application Ser. No. 07/500,386 filed on Mar. 27, 1990, now abandoned.

BACKGROUND OF THE INVENTION

The present invention relates to a homogeneous substitution method of a cake using a filter press and an apparatus therefor, which are widely utilized as solid-liquid separation and which are applicable to many fields and, more particularly, to collection of effective materials contained in the cake and removal of impurities in the cake in various steps of separation of inorganic medicines, organic medicines, plastic materials and the like in a chemical industry, separation of activated carbon used in a decoloring step in a food industry, and filtering of a sludge in a hydrometallurgy, and so on.

Generally, a filter press has widely been utilized in various fields of industry. However, the filter press has the following drawbacks. That is, in the case where impurities contained in a cake are removed or effective ingredients contained in the cake are collected by the use of the filter press, cracks are formed in the cake or a washing liquid is not homogeneously dispersed in the cake in view of construction in operation from hydration to washing. Thus, the filter press is deteriorate in efficiency of washing and is said to be unsuitable. For this reason, in operation which requires precision washing, filtering apparatuses of another type have been used such as, for example, a horizontal-belt type filtering apparatus, a drum type filtering apparatus, and the like. Since, however, the conventional filtering apparatuses such as the horizontal-belt type filtering apparatus, the drum type filtering apparatus and so on are systems in which vacuum suction is chiefly utilized, filtering speed is slow. Accordingly, in the case where a plenty amount of cakes is processed or a material difficult in filtering is processed, an amount of investment with respect to the filtering equipment or installation is large so that the filtering apparatuses are not economical. In view of this, it has been desired to develop a novel filtering apparatus which is high in processing ability.

By the way, conventionally, various attempts have been made to efficiently wash the cake by the use of the filter press. However, these attempts have not been succeeded. These attempts will be revealed as follows.

(1) There is a case where a both-side filtering apparatus having a single-side squeezing mechanism or a diaphragm is used, and washing water enters a space between a squeezed filtering cloth and a squeezed filtering plate unit from a rear side of the squeezed filtering cloth under such a condition that the squeezed filtering cloth is squeezed by the diaphragm, to wash the space. In this case, since a plurality of filtering-cloth supports on the squeezed filtering plate unit are in intimate or close contact with a cake through the squeezed filtering cloth, the washing water is not homogeneously in contact with the cake. Accordingly, washing effect is low.

(2) There is a case where the washing water enters the space between a squeezing filtering plate unit and a squeezing filtering cloth from a rear side thereof under such a condition that the squeezing filtering cloth is not squeezed by the diaphragm. In this case, since filtering-cloth retainers on the diaphragm are in close contact with the cake through the squeezing filtering cloth, the washing water cannot homogeneously be distributed, similarly to the above (1), so that washing effect is low.

(3) There is a case where, after squeezing due to the diaphragm, pressurizing water on the diaphragm is released in pressure to wash the cake between the squeezing and squeezed filtering cloths, from the rear side of the squeezing filtering cloth. In this case, since the impact is applied to the cake at releasing of the pressure so that cracks are formed in the cake, the washing water flows in a short-circuit manner so that washing effect is reduced.

(4) There is a case where washing is effected from the rear side of the squeezing filtering cloth under such a condition that a cake is formed before squeezing or under a slurry condition as it is. In this case, no cracks occur in the cake. Since, however, liquid is rich with respect to a solid material, a plenty of washing water is required.

In order to solve the above-discussed problems, the inventors of this application have made various researches and experiments. As a result, it has been found that, if the following items (a) through (c) are satisfied, the cake can effectively be washed even in the filter press.

(a) The cake must be washed under such a condition that the cake is squeezed. That is, deformation must not occur in the cake at washing.

(b) Such operations must not be done that a condition of the compressed cake is not temporarily loosened or relaxed or an external force is not mechanically applied to the compressed cake.

(c) The washing water must be in direct contact with the cake from the rear side of the filtering cloth. Efficiency is low if a plurality of projections or filtering-cloth supports are in direct contact with the filtering cloth to squeeze the cake.

SUMMARY OF THE INVENTION

It is therefore an object of the invention to provide a homogeneous substitution washing method in which, a filter press or a both-side filtering apparatus having a single-side squeezing mechanism is used so that impurities in a cake can efficiently be removed or effective materials can be collected, the filter press being of such type that slurry is supplied to a space between each pair of a plurality of pairs of opposed filtering cloths and is pressurized and dehydrated by a diaphragm provided on the side of one of the pair of filtering cloths to form the cake.

It is another object of the invention to provide an apparatus for carrying the above method into effect.

According to the invention, there is provided a homogeneous substitution washing method for a cake using a filter press which comprises a plurality of pairs of opposed squeezed and squeezing filtering plate units, a plurality of pairs of opposed squeezed and squeezing filtering cloths, each pair of said pairs of squeezed and squeezing filtering cloths being arranged between a corresponding pair of said pairs of squeezed and squeezing filtering plate units, and a plurality of diaphragms, each of said diaphragms being arranged each side opposed to the squeezed filtering plate unit of the squeezed filter plate unit of a corresponding pair of said pairs of squeezed and squeezing filtering plate units, wherein stock solution is supplied into a space between the pair of squeezed and squeezing filtering cloths, and is pressurized and dehydrated by the diaphragm to form the cake, the cake being processed in washing to obtain a clean raw material, said homogeneous substitution washing method characterized in that: said wash-processing step comprising the step of:

in parallel with the pressurizing and dehydrating step of the stock solution, pouring a washing liquid into a space between the diaphragm and the squeezing filtering cloth abutted against the diaphragm, at a pressure at least equal to a pressurizing and dehydrating pressure applied to the stock solution through the diaphragm, to wash the cake between the pair of squeezed and squeezing filtering cloths.

According to the invention, there is also provided a homogeneous substitution washing apparatus for a cake using a filter press which comprises a plurality of pairs of opposed squeezed and squeezing filtering plate units, a plurality of pairs of opposed squeezed and squeezing filtering cloths, each pair of said pairs of squeezed and squeezing filtering cloths being arranged between a corresponding pair of said pairs of squeezed and squeezing filtering plate units, and a plurality of diaphragms, each of said diaphragms being arranged on each side opposed to the squeezed filtering plate unit of the squeezed filter plate unit of a corresponding pair of said pairs of squeezed and squeezing filtering plate units, wherein stock solution is supplied into a space between the pair of squeezed and squeezing filtering cloths, and is pressurized and dehydrated by the diaphragm to form the cake, the cake being processed in washing to obtain a clean raw material, whereby said filter press comprising:

a filtered-liquid chamber defined between the squeezed filtering plate unit and the squeezed filtering cloth;

a washed-article chamber defined between the squeezed filtering cloth and the squeezing filtering cloth;

a washing-liquid chamber defined between the squeezing filtering cloth and the diaphragm; and a pressurizing-water chamber defined between the diaphragm and the squeezing filtering plate unit.

In the homogeneous substitution washing method and apparatus for the cake using the filter press, according to the invention, the washing liquid is poured into the space between the squeezing filtering cloth and the diaphragm at a pressure which is identical with the diaphragm pressure after completion of the diaphragm squeezing. Washing is commenced without a change of the squeezed condition of the cake. From such a condition that the squeezing filtering cloth is in contact with a plurality of projections or filtering-cloth supports between filtered-liquid grooves in the diaphragm, the washing-liquid pressure between the squeezing filtering cloth and the diaphragm is so controlled as to exceed the diaphragm pressure, to return the diaphragm toward the squeezing filtering plate unit. A volume of the pressurizing-water chamber is reduced to move the squeezing filtering cloth away from the filtering-cloth supports on the diaphragm, thereby homogeneously supplying the washing liquid to the entire surface of the cake from the rear side of the squeezing filtering cloth.

By the way, under this condition, the squeezed filtering cloth is maintained in contact with the filtering-cloth retainers or the projections between the grooves in the squeezed filtering plate unit. If the thickness of the cake is brought to a value equal to or higher than approximately 6 mm, an affection or influence of the filtering-cloth supports is reduced. That is, it is considered that the washing liquid homogeneously supplied from the rear side of the squeezing filtering cloth flows through the cake, in a substantially straight manner, to the contact area between the squeezed filtering cloth and the filtering-cloth supports on the squeezed filtering plate unit.

As described above, with the arrangement of the method according to the invention, the washing-liquid pressure exceeds the diaphragm pressure, whereby the diaphragm is returned toward the squeezing filtering plate unit to separate the squeezing filtering cloth from the filtering-cloth supports on the diaphragm. By doing so, the washing liquid is homogeneously supplied to the entire surface of the washed article from the rear side of the squeezing filtering cloth. Thus, impurities in the washed article can efficiently be removed, or effective materials can be collected.

With the arrangement of the apparatus according to the invention, the pressurizing water is supplied to the pressurizing-water chamber. The washing liquid having its pressure higher than the pressure of the pressurizing water is supplied to the washing-liquid chamber and, simultaneously, the pressurizing water is gradually released in pressure. Thus, the washing-liquid chamber is filled with the washing liquid so that substitution is effected. Accordingly, it is possible to prevent deformation from occurring in the washed article within the washed-article chamber. Further, an abrupt external force is not applied to the washed article and, accordingly, no cracks and so on occur in the washed article, and the washing liquid is homogeneously spread over the entire surface of the washed article without variation. Thus, it is possible to improve the washing efficiency.

Preferably, the homogeneous substitution washing apparatus further includes pump means for supplying the stock solution to the washed-article chamber and for supplying the washing liquid to the washing-liquid chamber, flow-rate control means associated with the pump means for controlling flow rates of the respective stock solution and washing liquid, supply-pressure control means associated with the pump means for controlling supply pressures of the respective stock solution and washing liquid, and supply-pressure control means associated with the pressurizing-water chamber for controlling a supply pressure of the pressurizing water.

With the above arrangement of the invention, the following advantages are obtained. That is, supply of the stock solution into the washed-article chamber, supply of the pressurizing water into the pressurizing-water chamber, and supply of the washing liquid into the washing-liquid chamber can be effected smoothly by the flow-rate control means and the supply-pressure control means. The washed article can smoothly be accommodated in the washed-article chamber. Transition from the pressurizing and dehydration due to the pressurizing water to the washing due to the washing liquid can easily be done. No abrupt change in pressure is applied to the washed article. Cracks or the like are not generated in the washed article.

DESCRIPTION OF THE EMBODIMENTS

Figure 1:
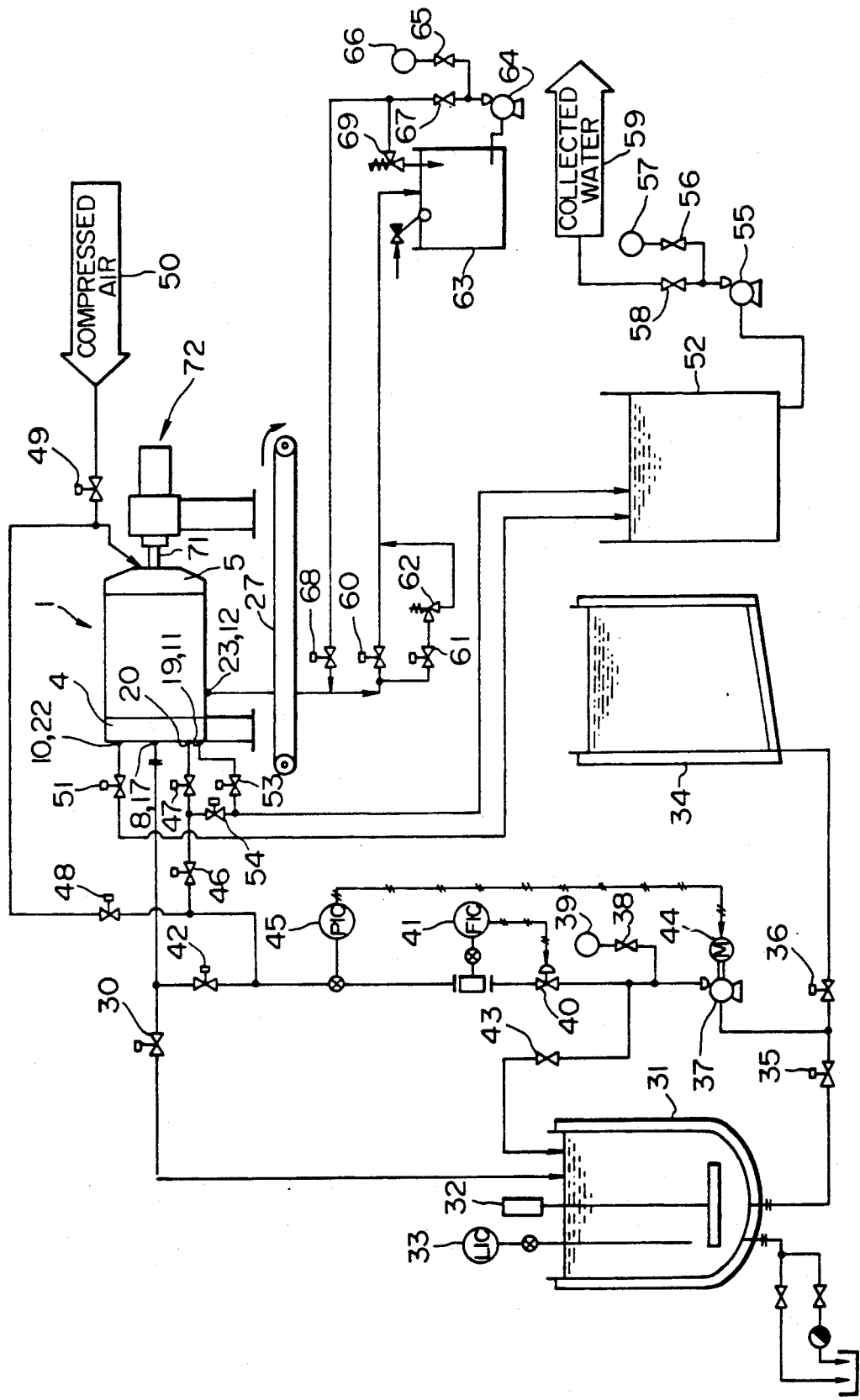
FIG. 1 is a schematic constitutional view showing an embodiment of the invention.
Figure 2:
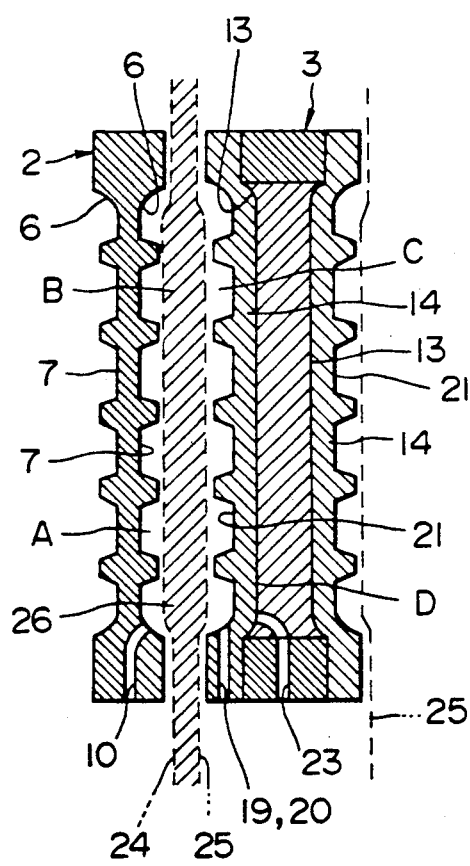
FIG. 2 is a schematic cross-sectional view of one pair of a plurality of pairs of squeezed and squeezing filtering plate units which are incorporated in a filter press illustrated in FIG. 1.

Referring to FIG. 1, there is shown a homogeneous substitution or replacement washing apparatus for a cake using a filter press 1, according to an embodiment of the invention. The filter press 1 comprises a plurality of pairs of squeezed filtering plate units 2 and squeezing filtering plate units 3 as shown in FIG. 2. The plurality of pairs of squeezed filtering plate units 2 and squeezing filtering plate units 3 are mounted on a piston rod 71 of a piston/cylinder assembly 72 and are arranged between a pair of frames 4 and 5 in parallel relation thereto and in end-to-end relation to each other. By the piston rod 71 of the piston/cylinder assembly 72, the pairs of squeezed and squeezing filtering plate units 2 and 3 shown in FIG. 2 can move toward and away from each other.

Figure 3:
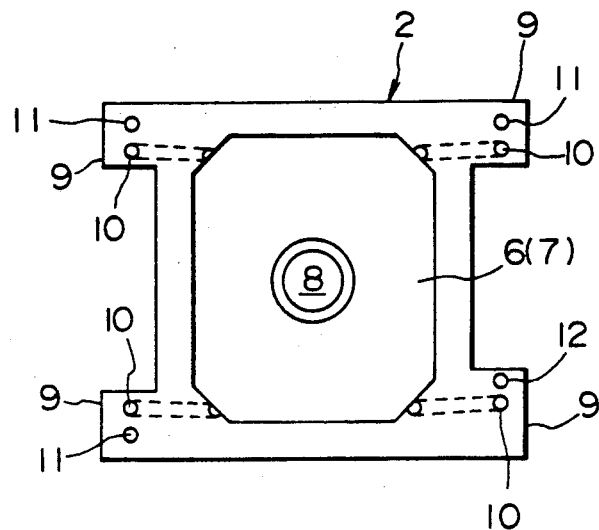
FIG. 3 is a side elevational view of the squeezed filtering plate unit illustrated in FIG. 2, with a plurality of filtered-liquid grooves omitted from illustration.

As shown in FIG. 2 and FIG. 3 which is a side elevational view of each of the squeezed filtering plate units 2 illustrated in FIG. 2, the filtering plate unit 2 has, at its both end faces, a pair of recesses 6 and 6. A plurality of filtered-liquid grooves 7 are formed in each of the recesses 6 and 6 so that the recess 6 has its irregular surface. Stock solution is supplied through a supply bore 8 which is formed at a center of an end face of the squeezed filtering plate unit 2. The squeezed filtering plate unit 2 has ear sections 9 which are provided respectively at four corners. Filtered-liquid outlet bores 10 on the squeezed side are formed respectively in the ear sections 9. These filtered-liquid outlet bores 10 on the squeezed side open respectively to four corners of each of the recesses 6 and 6. Three corners of the ear sections 9 are formed respectively with filtered-liquid outlet bores 11 on the squeezing side. The remaining ear section 9 is formed with an entrance and exit bore 12 for pressurized water.

Figure 4:
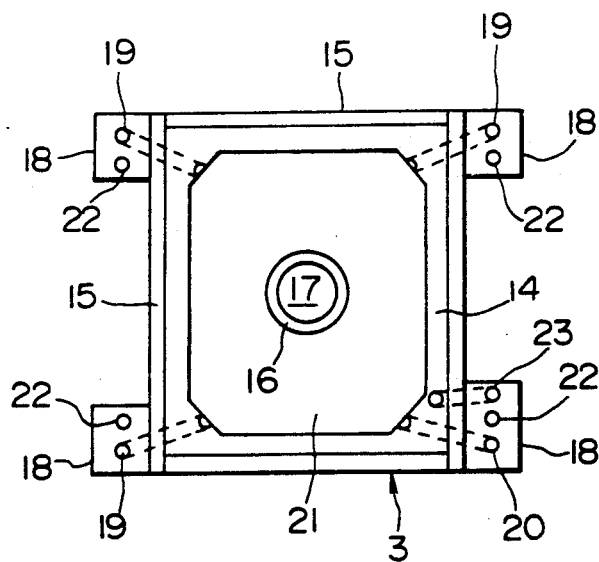
FIG. 4 is a side elevational view of the squeezing filtering plate unit illustrated in FIG. 2, with a plurality of filtered-liquid grooves in a diaphragm omitted from illustration.

On the other hand, as shown in FIG. 2 and FIG. 4 which is a side elevational view of each of the squeezed filtering plate units 3 illustrated in FIG. 2, the squeezed filtering unit 3 has, at its both end faces, a pair of recesses 13 and 13. A pair of diaphragms 14 and 14 are arranged respectively on the recesses 13 and 13. Each of the pair of diaphragms 14 and 14 is so arranged as to be movable toward and away from a corresponding one of the pair of recesses 13 and 13, by diaphragm retainers 15 and a diaphragm retaining ring 16. A supply bore 17 for the stock solution is formed at the center of an end face of the squeezing filtering plate unit 3. The squeezing filtering plate unit 3 has ear sections 18 respectively at the four corners. The three ear sections 18 are formed respectively with filtered-liquid outlet bores 19, and the remaining ear section 18 is formed with a communication bore 20 which serves as a filtered-liquid outlet and an inlet for washing water. The pair of filtered-liquid outlet bores 19 opens to four corners of a group of filtered-liquid grooves 21 which have an irregular surface and which are formed in the diaphragm 14. The ear sections 18 are formed respectively with filtered-liquid outlet bores 22 on the squeezed side. One of the ear sections 18 is formed with an entrance and exit bore 23 for pressurized water. The entrance and exit bore 23 opens to the corner of the recess 13.

It should be noted that the filter press 1 is known well, and FIG. 2 is a schematic cross-sectional view of the pair of filtering plate units 2 and 3 and is different from the actual cross-section of the pair of filtering plate units 2 and 3 shown respectively in FIGS. 3 and 4. The cross-section of the pair of filtering plate units 2 and 3 is schematically shown in FIG. 2 for facilitating understanding of the invention. Thus, the filtered-liquid grooves 7 in the squeezed filtering plate unit 2 and the filtered-liquid grooves 21 in the diaphragm 14 are omitted from illustration.

When both the filtering plate units 2 and 3 are superimposed upon each other, the filtered-liquid outlet bores 10 and 22 of the respective filtering plate units 2 and 3 communicate with each other, the filtered-liquid outlet bores 19 and 11 communicate with each other, and the entrance and exit bores 12 and 23 for pressurized water communicate with each other. Further, as shown in FIG. 2, a pair of filtering cloths 24 and 25 are clamped between the pair of adjacent filtering plate units 2 and 3. A space between the recess 6 in the squeezed filtering plate unit 2 and the squeezed filtering cloth 24 is defined into a filtered-liquid chamber A. A space between the squeezed filtering cloth 24 and the squeezing filtering cloth 25 is defined into a washed-article chamber B for accommodating therein a washed article 26 which is a cake from slurry. A space between the squeezing filtering cloth 25 and the diaphragm 14 is defined into a washing-liquid chamber C. A space between the diaphragm 14 and the squeezing filtering plate unit 3 is defined into a pressurizing water chamber D. Further, as shown in FIG. 1, a conveyor 27 is arranged below the filter press 1 for carrying the cake out of the space between the filtering plate units 2 and 3 when the filtering plate units 2 and 3 are moved away from each other by the piston rod 71 of the piston/cylinder assembly 72.

As shown in FIG. 1, the stock-solution supply bores 8 and 17 are connected to a stock-solution tank 31 through an automatic valve 30 under such a condition that the stock-solution supply bores 8 and 17 communicate with each other. A steering device 32 and a level meter 33 are arranged within the stock-solution tank 31. The stock-solution tank 31 and a washing tank 34 have their respective outlets to which a suction port of a supply pump 37 is connected respectively through automatic valves 35 and 36. Further, the supply pump 37 has a discharge port which is connected to a pressure gage 39 through a manual valve 38. The discharge port of the supply pump 37 is connected to the stock-solution supply ports 8 and 17 through a control valve 40, a flow-rate control indicating detector 41 for controlling the control valve 40, and an automatic valve 42. Further, the discharge port of the supply pump 37 is connected to the stock-solution tank 31 through a manual valve 43. A motor 44 for driving the supply pump 37 is electrically controlled by a control indicating detector 45 which is arranged between the flow-rate control indicating detector 41 and the automatic valve 42.

The communication bore 20 is connected to a section between the flow-rate control indicating detector 41 and the automatic valve 42, through a pair of automatic valves 46 and 47. The communication bore 20 is also connected to the side of the frame 5 through an automatic valve 48. A compressed-air supply source 50 is connected to the side of the frame 5 through an automatic valve 49. Thus, the washing water or compressed air can be supplied to the washed-article chamber B from the side of the frame 5.

A collection-water tank 52 is connected to the filtered-liquid outlet bores 10 and 22 through an automatic valve 51. The filtered-liquid outlet bores 19 and 11 are connected to the collection-water tank 52 through an automatic valve 53. The collection-water tank 52 is connected to a section between the automatic valves 46 and 47 through an automatic valve 54. The collection-water tank 52 has an outlet to which a suction port of a collection-water delivery pump 55 is connected. The collection-water delivery pump 55 has a discharge port to which a pressure gage 57 is connected through a manual valve 56. A collection-water delivery system 59 is connected to the discharge port of the collection-water delivery pump 55 through a manual valve 58.

A pressurizing-water tank 63 is connected to the entrance and exit bore 23 for pressurized water through an automatic valve 60, an automatic valve 61 and a pressure regulating valve 62. The pressurizing-water pump 63 has an outlet to which a suction port of a pressurizing-water pump 64 is connected. The pressurizing-water pump 64 has a discharge port to which a pressure gage 66 is connected through a manual valve 65. The entrance and exit bore 23 for pressurizing water is connected to the discharge port of the pressurizing-water pump 64 through a manual valve 67 and an automatic valve 68. The pressurizing-water tank 63 is connected to a section between the manual valve 67 and the automatic valve 68 through a pressure regulating valve 69.

The case will be described below where a method according to the invention is carried into practice by the homogeneous substitution washing apparatus for the cake using the filter press 1, constructed as above.

First, the space between the filtering plate units 2 and 3 is closed. Under the condition that the automatic valves 35 and 42 are open, the supply pump 37 is driven whereby the stock solution within the stock-solution tank 31 is supplied to the washed-article chamber B formed between the filtering cloths 24 and 25, from the stock-solution supply bores 8 and 17 through the automatic valve 35, the supply pump 37, the control valve 40 and the automatic valve 42. Filtered liquid, which is filtered in accordance with stock-solution pressure by the filtering cloths 24 and 25, flows out into the filtered-liquid chamber A formed between the squeezed filtering cloth 24 and the squeezed filtering plate unit 2 and into the washing-liquid chamber C formed between the squeezing filtering cloth 25 and the diaphragm 14. In this case, as shown in FIG. 1, the automatic valves 47, 51, 53 and 54 are open previously, whereby the filtered liquid is guided along the filtered-liquid grooves 7 formed in the squeezed filtering plate unit 2 and the filtered-liquid grooves 21 formed in the diaphragm 14. Subsequently, the filtered liquid is discharged to the outside of the filter press 1 through the filtered-liquid outlet bores 10 and 22 and 19 and 11 and the communication bore 20. The filtered liquid is collected into the collection-water tank 52 through the automatic valves 51, 53, 47 and 54.

After a predetermined period of time has elapsed, supply of the stock solution to the filter press 1 from the stock-liquid tank 31 is suspended. Subsequently, by the pressurizing-water pump 64, the pressurizing water is supplied to the pressurizing-water chamber D formed between the diaphragm 14 and the squeezing filtering plate unit 3, from the pressurizing-water tank 63 through the pressurizing-water pump 64, the manual valve 67, the automatic valve 68 and the entrance and exit bores 12 and 23 for pressurizing water. By doing so, the diaphragm 14 is moved away from the squeezing filtering plate unit 3 and presses the squeezing filtering cloth 25. Thus, the squeezing operation due to the diaphragm pressure starts. The washed article 26 between the filtering cloths 24 and 25 is further pressurized so that the filtered liquid flows out into the filtered-liquid chamber A and the washing-liquid chamber C through the filtering cloths 24 and 25. Similarly to the aforementioned stock-solution supply step, the filtered liquid is guided by the filtered-liquid grooves 7 and 21. The filtered liquid passes through the filtered-liquid outlet ports 10 and 22 and 19 and 11 and the communication bore 20, and is discharged to the outside of the filter press 1. The filtered liquid is collected into the collection-water tank 52 through the automatic valves 51, 53, 47 and 54.

After a predetermined period of time has elapsed, the pressure of the pressurizing water supplied into the pressurizing-water chamber D by the pressurizing-water pump 64 is maintained at a constant pressure. The automatic valve 61 is open. When the pressure equal to or higher than the predetermined pressure is applied to the pressurizing-water chamber B, the pressurizing water is returned to the pressurizing-water tank 63 through the pressure regulating valve 62. Under this condition, the automatic valves 36 and 46 are open, and the automatic valves 53 and 54 are closed. The supply pump 37 is driven to supply the washing water within the washing tank 34 to the washing-water chamber C from the communication bore 20 through the automatic valve 36, the supply pump 37, the control valve 40, and the automatic vales 46 and 47. In this case, the control valve 40 is controlled on the basis of a value detected by the flow-rate control indicating detector 41, to regulate a quantity of the washing water. The motor 44 is controlled on the basis of a value detected by the pressure-control indicating detector 45, to regulate the pressure of the washing water supplied into the washing-water chamber C such that the pressure of the washing water slightly exceeds the pressure of the pressurizing water.

As a result, the washing water flows into the space between the diaphragm 14 and the squeezed filtering cloth 25 which has been pressed by the diaphragm 14 until now. Further, the pressure of the washing water exceeds the pressing force of the diaphragm 14. Thus, the diaphragm 14 is slightly returned toward the squeezing filtering plate unit 3, and the volume within the pressurizing-water chamber D is reduced. As a result, the squeezing filtering cloth 25 and the projections between the filtered-liquid grooves 21 in the diaphragm 14, which have been in contact with each other until now, are moved away from each other. The washing water is supplied from the space between the squeezing filtering cloth 25 and the projections between the filtered-liquid grooves 21 in the diaphragm 14, into the washed-article chamber B through the squeezing filtering cloth 25. Accordingly, the washing water passes homogeneously through the entire surface of the squeezing filtering cloth 25, and flows into the washed-article chamber B. Further, the washing water is transmitted through the washed article 26 within the washed-article chamber B horizontally and in a substantially straight manner, and flows out into the filtered-liquid chamber A through the squeezed filtering cloth 24. Moreover, the washing water having entered the filtered-liquid chamber A is guided by the filtered-liquid grooves 7 in the squeezed filtering plate unit 2 and is discharged to the outside of the filter press 1 from the filtered-liquid outlet bores 10 and 22. Thus, the washing water is collected into the collecting-water tank 52 through the automatic valve 51.

When the washing step has been completed after a lapse of a predetermined period of time, the automatic valve 46 is closed, and the automatic valves 48 and 30 are open so that the washing water is supplied to the washed-article chamber B from the washing tank 34 through the supply pump 37, the control valve 40 and the automatic valve 48, from the side of the frame 5 of the filter press 1, to wash the washed-article chamber B. Subsequently, the washing water is discharged into the stock-solution tank 31 through the automatic valve 30 for a predetermined period of time. The automatic valves 47, 54, 51 and 53 are open to collect the washing water within the washed-article chamber B into the collection-water tank 52 from the filtered-liquid chamber A and the washing-liquid chamber C.

After supply of the washing water has been suspended, the automatic valves 49 and 60 are open to that the compressed air is supplied to the washed-article chamber B from the compressed-air supply source 50 through the automatic valve 49, from the side of the frame 5 of the filter press 1. By doing so, the diaphragm 14 is pressed or urged against the squeezing filtering plate unit 3. Thus, the pressurizing water within the pressurizing-water chamber D is returned to the pressurizing-water tank 63 through the automatic valve 60. The compressed air enters the filtered-liquid chamber A and the washing-liquid chamber C from the washed-article chamber B. The compressed air passes through the filtered-liquid outlet bore 10, 22, 19 and 11, and is discharged to the collection-water tank 52 through the automatic valves 51, 53, 47 and 54. Accordingly, the washing water within the washed-article chamber B, the filtered-liquid chamber A and the washing-liquid chamber C is smoothly collected into the collection-water tank 52, and the washed article or cake 26 within the washed-article chamber B is dried reliably.

Subsequently, the filtering plate units 2 and 3 are moved away from each other. The washed article 26 within the washed-article chamber B falls down and rests on the conveyor 27 so that the washed article 26 is carried out by the conveyor 27. Subsequently, the filtering plate units 2 and 3 are again closed to repeat the steps described previously.

The results, which actually prove the effectiveness of the invention by the use of a both-side filtering apparatus having a single-side diaphragm and having an internal size or dimension of 400 mm×400 mm, will be described together with comparative examples (i) through (iv). Slurry or stock solution used in this experiment is a mixture of water and fine-particle calcium carbonate, and has a particle distribution which has a mean diameter of 2.0 B&L4m. The experiment has been conducted for the purpose of collecting caustic soda or sodium hydroxide. In this connection, the experiment has been conducted as such basic operational conditions that filtering pressure is four (4) bar gage, and squeezing pressure is four (4) bar gage. The following results of the experiment have been obtained.

Comparative Examples (i) A both-side filtering apparatus having a single-side squeezing mechanism or a diaphragm was used, and washing water entered a space between a squeezed filtering cloth and a squeezed filtering plate unit from a rear side of the squeezed filtering cloth under such a condition that the squeezed filtering cloth was squeezed by the diaphragm, to wash the space. In this case, the following results have been obtained:
Thickness of Cake: about 15 mm
Alkaline in Cake (before washing): 2.5 wt%
Alkaline in Cake (after washing): 1.3 wt% 0.61 wt%
Washing Ratio (Washing Water/Dried Cake): 0.8 4.0
Washing-water Pressure: 4.0 bar gage (ii) Washing water entered the space between a squeezing filtering late unit and a squeezing filtering cloth from a rear side thereof under such a condition that the squeezing filtering cloth was not squeezed by the diaphragm. In this case, the following results have been obtained:
Thickness of Cake: about 15 mm
Alkaline in Cake (before washing): 2.5 wt%
Alkaline in Cake (after washing): 1.2 wt% 0.53 wt%
Washing Ratio: 0.8 4.0

(iii) After squeezing due to the diaphragm, pressurizing water on the diaphragm was released in pressure to wash the cake between the squeezing and squeezed filtering clothes, from the rear side of the squeezing filtering cloth. In this case, the following results have been obtained:
Thickness of Cake: about 15 mm
Alkaline in Cake (before washing): 2.5 wt%
Alkaline in Cake (after washing): 1.63 wt% 1.2 wt%
Washing Ratio: 0.8 4.0

(iv) Washing was effected from the rear side of the squeezing filtering cloth under such a condition that squeezing of a cake was not completely and under a slurry condition as it was. In this case, the following results have been obtained:
Thickness of Cake: 30 mm (Presumption: 40 wt%)
Alkaline in Cake (before washing): 2.5 wt%
Alkaline in Cake (after washing): 1.5 wt% 0.3 wt% 0.2 wt%
Washing Ratio: 0.8 4.0 6.0

Experimental Example of Invention

Washing water was supplied from the rear side of the squeezing filtering cloth, with washing-water pressure four (4) bar>diaphragm (pressurizing water) pressure. In this case, the following results have been obtained:
Thickness of Cake: about 15 mm
Alkaline in Cake (before washing): 2.5 wt%
Alkaline in Cake (after washing): 0.85 wt% 0.13 wt%
Washing Ratio: 0.8 4.0

As described above, it has been found that the embodiment of the invention is high in washing efficiency as compared with the comparative examples (i) through (iv), and does not need a plenty a washing water as is in the comparative example (iv). Thus, the filter press according to the embodiment of the invention is widely applicable to fields which require the substitution washing method.

In connection with the above, it has been described that the stock solution is supplied through the stock-solution supply bores 8 and 17 which are provided respectively at the centers of the filtering plate units 2 and 3. However, the invention should not be limited to this specific arrangement. As the case may be, the stock solution may be supplied from edges of the respective filtering plate units 2 and 3.

What is claimed is:

1. A homogeneous substitution washing method for a cake using a filter press which comprises a plurality of pairs of opposed squeezed and squeezing filtering plate units, a plurality of pairs of opposed squeezed and squeezing filtering cloths, each pair of said pairs of squeezed and squeezing filtering cloths being arranged between a corresponding pair of said pairs of squeezed and squeezing filtering plate units, and a plurality of diaphragms, each of said diaphragms being arranged on each side opposed to the squeezed filtering plate unit of the squeezing filtering plate unit or a corresponding pair of said pairs of squeezed and squeezing filtering plate units, the homogeneous substitution washing method comprising the steps of:

supplying stock solution into a space between the pair of squeezed and squeezing filtering cloths, pressurizing and dehydrating the stock solution using the diaphragm to form the cake, and wash-processing the cake to obtain a clean raw material;

wherein the wash-processing step comprises the step of:

in parallel with the pressurizing and dehydrating step, pouring a washing liquid into a space between the diaphragm and the squeezing filtering cloth abutted against the diaphragm, at a pressure at least equal to a pressurizing and dehydrating pressure applied to the stock solution through the diaphragm, to wash the cake between the pair of squeezed and squeezing filtering cloths.

2. A homogeneous substitution washing apparatus for a cake, the apparatus including a filter press which comprises a plurality of pairs of opposed squeezed and squeezing filtering plate units, a plurality of pairs of opposed squeezed and squeezing filtering cloths, each pair of said pairs of squeezed and squeezing filtering cloths being arranged between a corresponding pair of said pairs of squeezed and squeezing filtering plate units, and a plurality of diaphragms, each of said diaphragms being arranged on each side opposed to said squeezed filtering plate unit of the squeezing filtering plate unit of a corresponding pair of said pairs of squeezed and squeezing filtering plate units, wherein stock solution is supplied into a space between the pair of squeezed and squeezing filtering cloths, and is pressurized and dehydrated by the diaphragm to form the cake, the cake being processed in washing to obtain a clean raw material, said filter press further comprising:

a filtered-liquid chamber defined between the squeezed filtering plate unit and the squeezed filtering cloth;

a washed-article chamber defined between the squeezed filtering cloth and the squeezing filtering cloth;

a washing-liquid chamber defined between the squeezing filtering cloth and the diaphragm; and a pressurizing-water chamber defined between the diaphragm and the squeezing filtering plate unit;

wherein said homogeneous substitution washing apparatus further comprises:

pump means for supplying said stock solution to said washed-article chamber and for supplying said washing liquid to said washing-liquid chamber;

flow-rate control means associated with said pump means for controlling flow rates of said respective stock solution and washing liquid;

supply-pressure control means associated with said pump means for controlling supply pressures of said respective stock solution and washing liquid; and supply-pressure control means associated with said pressuring-water chamber for controlling a supply pressure of said pressurizing water;

said flow-rate control means controlling said flow rate of said washing liquid so that said washing liquid is supplied to said washing-liquid chamber in parallel with said pressurizing and dehydrating step of said stock solution;

said supply-pressure control means associated with said pump means, regulating said supply pressure of said washing-liquid to said washing-water chamber so that said washing water is supplied at a pressure at least equal to a pressurizing and hydrating pressure supplied to said stock solution through said diaphragm.

* * * * *